US012704630B2

(12) United States Patent
Ghallabi

(10) Patent No.: US 12,704,630 B2
(45) Date of Patent: Aug. 11, 2026

(54) METHOD OF ROAD DETECTION FOR AN AUTOMOTIVE VEHICLE FITTED WITH A LIDAR SENSOR

(71) Applicant: Renault s.a.s., Boulogne-Billancourt (FR)

(72) Inventor: Farouk Ghallabi, Massy (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 1118 days.

(21) Appl. No.: 17/274,304

(22) PCT Filed: Jul. 8, 2019

(86) PCT No.: PCT/EP2019/068265
§ 371 (c)(1),
(2) Date: Mar. 8, 2021

(87) PCT Pub. No.: WO2020/052830
PCT Pub. Date: Mar. 19, 2020

(65) Prior Publication Data
US 2021/0333397 A1 Oct. 28, 2021

(30) Foreign Application Priority Data
Sep. 11, 2018 (FR) ...................................... 1858137

(51) Int. Cl.
*G01S 17/42* (2006.01)
*B60W 30/12* (2020.01)
(Continued)

(52) U.S. Cl.
CPC .............. *G01S 17/42* (2013.01); *G01S 17/89* (2013.01); *G01S 17/931* (2020.01);
(Continued)

(58) Field of Classification Search
CPC ..................................................... G01S 17/931
See application file for complete search history.

(56) References Cited

U.S. PATENT DOCUMENTS

2010/0217529 A1 8/2010 Stroila et al.
2013/0142394 A1* 6/2013 Li .......................... G06T 7/571
382/106
(Continued)

OTHER PUBLICATIONS

Nixon, Aguado, "Gaussian Filtering", 2005, Electronics and Computer Science University of Southampton (Year: 2005).*
(Continued)

*Primary Examiner* — Helal A Algahaim
*Assistant Examiner* — Clara G Chilton
(74) *Attorney, Agent, or Firm* — Oblon, McClelland, Maier & Neustadt, L.L.P.

(57) ABSTRACT

A road detection method for a motor vehicle provided with at least one rotary multilayer LIDAR sensor and at least one data processor includes acquiring LIDAR data of the environment of the vehicle. The data for which the angle of the beam with respect to the plane of the vehicle is greater than or equal to zero are eliminated from the acquired LIDAR data. For each LIDAR datum, theoretical coordinates of a point are determined as a function of the angle of the beam with respect to the plane of the vehicle and of the angle of the beam in the plane of the vehicle. The standard deviation between the theoretical coordinates and the coordinates of the LIDAR datum is determined. Then, it is determined that the LIDAR datum forms part of the road if the standard deviation is lower than a predefined threshold.

10 Claims, 2 Drawing Sheets

Figure 1:
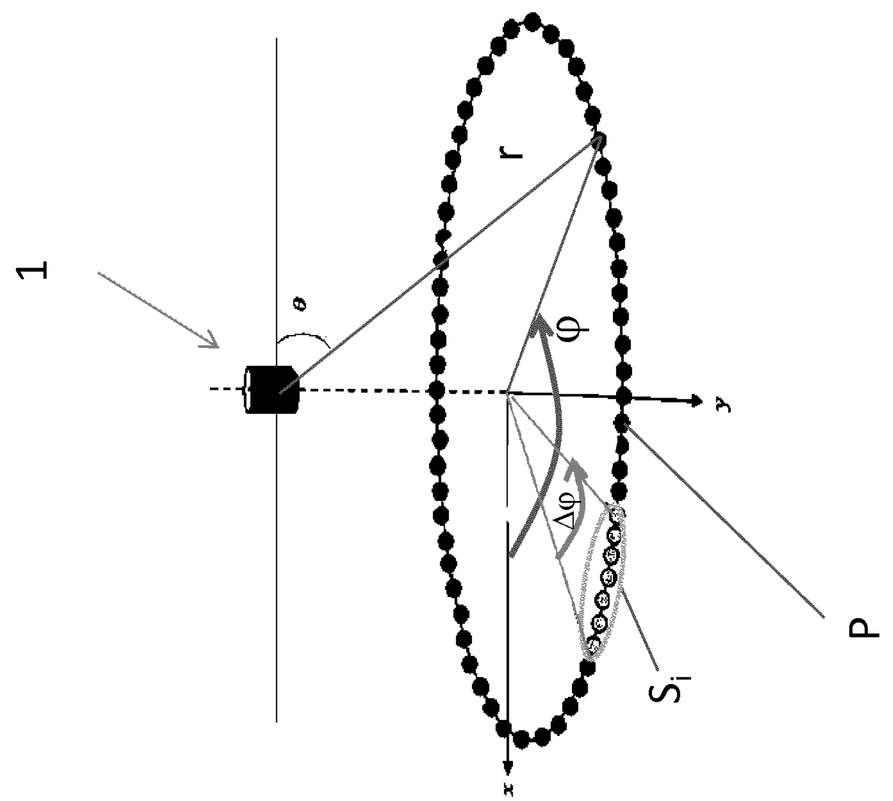

(51) Int. Cl.
*G01S 17/89* (2020.01)
*G01S 17/931* (2020.01)
*G05D 1/00* (2024.01)

(52) U.S. Cl.
CPC .......... *G05D 1/0236* (2013.01); *B60W 30/12* (2013.01); *B60W 2552/53* (2020.02)

(56) References Cited

U.S. PATENT DOCUMENTS

| | | | | |
|---|---|---|---|---|
| 2014/0081573 | A1* | 3/2014 | Urmson | G01S 17/42 356/600 |
| 2014/0180590 | A1 | 6/2014 | Stroila et al. | |
| 2014/0233790 | A1* | 8/2014 | Chen | G01S 17/89 356/614 |
| 2018/0211119 | A1 | 7/2018 | Liu et al. | |
| 2019/0324471 | A1* | 10/2019 | Kim | G01S 17/931 |

OTHER PUBLICATIONS

International Search Report issued Sep. 24, 2019 in PCT/EP2019/068265 filed Jul. 8, 2019, 2 pages.

Soren Kammel, et al., "Lidar-based lane marker detection and mapping," 2008 IEEE Intelligent Vehicles Symposium, XP031318963, 2008, 6 pages.

* cited by examiner

METHOD OF ROAD DETECTION FOR AN AUTOMOTIVE VEHICLE FITTED WITH A LIDAR SENSOR

The technical field of the invention is the control of autonomous vehicles and, more particularly, traffic lane detection for controlling such vehicles.

The satellite positioning system currently used is the global navigation satellite system GNSS that allows a position to be obtained with an accuracy to within a few meters. It should be noted that the GNSS systems with real-time kinematic RTK correction have an accuracy in the order of 5 cm. However, such systems are very costly and cannot be used for series-production vehicles.

Otherwise, merging a commercial GNSS system with additional sensors makes it possible to fill the gaps therein. The additional sensors can be an accelerometer, a gyroscope or an odometer. The accuracy obtained for a commercial GNSS system thus complemented with additional sensors, such as the “u-blox” sensor, is approximately 2-3 m.

This accuracy is still not sufficient to achieve locating of the traffic lane in which the vehicle is located (“lane level”).

Lower camera prices and improved recognition algorithms have made it possible to remedy this problem by using a camera to detect the marking lines and consequently to recognize the driving lane. Nevertheless, the detection is not perfect. Since the camera is a passive sensor, it does not produce its own light source and therefore does not function in the absence of light. Moreover, the principle of the camera relies on a projective geometry of the 3D environment on a 2D plan resulting in a loss of 3D information of the environment. That makes the task of 3D reconstruction of the environment difficult in the case of a single camera (monocular case).

There are however solutions involving active sensors, currently available on the market, that offer a 3D representation of the environment, such as LIDAR sensors (acronym for “Light Detection and Ranging”, which detect and determine distance based on light). Such a sensor is capable of collecting a very dense cloud of points which can reach 700 000 points for each complete rotation of the sensor. The cloud of points thus obtained represents a large quantity of data, refreshed periodically. Processing such data in real time is a real technological challenge.

In this particular case, one objective is to segment the road in order to reduce the quantity of data to be processed and speed up the processing thereof.

In fact, the road represents only a subset of the totality of the LIDAR data.

From the state of the art, the use of sensors for obtaining the surface of the road in proximity to a vehicle is known. Once measurements of the road have been recovered using a sensor, the data representing the road are eliminated by applying filters to keep only the road markings. Two filters are mentioned, a difference filter for detecting lane boundaries and a Gaussian filter. The filtered data are then compared to the expected lane markings. Information on the expected lane markings is present in a pile comprising data on road sections such as the lane width at specific points, the position of the lanes and the relationship between the lanes.

However, this document does not describe how the road is identified to be able to isolate the markings and employs the data representing the road. It also relies on the prior identification of the lane to simplify the processing, which requires prior work for the system to be usable.

The technical problem to be resolved is therefore that of delineating a road effectively and efficiently.

The subject of the invention is a road detection method for a motor vehicle provided with a rotary multilayer LIDAR sensor and at least one data processing means, comprising the following steps:

LIDAR data of the environment of the motor vehicle are acquired as polar coordinates with the LIDAR sensor, the data for which the polar coordinate relating to the angle of the beam with respect to the plane of the vehicle is greater than or equal to zero are eliminated from the acquired LIDAR data, for each angle of the beam with respect to the plane of the vehicle, and for each LIDAR datum, the following steps are carried out:

theoretical coordinates of a point, corresponding to the LIDAR datum, are determined as a function notably of the angle of the beam with respect to the plane of the vehicle and of the angle of the beam in the plane of the vehicle, the standard deviation between the theoretical coordinates and the coordinates of the LIDAR datum is determined, and it is determined that the LIDAR datum forms part of the road if the standard deviation is lower than a predefined threshold.

A LIDAR datum can be a point of the cloud of points acquired by the LIDAR sensor over one revolution, or a section comprising at least two consecutive points of the cloud of points acquired by the LIDAR sensor that have the same beam angle with respect to the plane of the vehicle.

When the LIDAR datum is a point of the cloud of points, it is possible to determine the theoretical coordinates of the point corresponding to the LIDAR datum as those of a point contained in an ideal circle inscribed within the plane of the road centered on the vehicle.

When the LIDAR datum is a section comprising at least two points of the cloud of points, the theoretical coordinates and the coordinates of the sections being defined as Cartesian coordinates and comprising a coordinate in the direction of movement of the vehicle in the plane of the vehicle, a coordinate in a direction at right angles to the direction of movement of the vehicle in the plane of the vehicle and a theoretical coordinate on the normal to the plane of the vehicle, the theoretical coordinate on the normal to the plane of the vehicle can be defined as the average of the coordinates on the normal to the plane of the vehicle of the points of the cloud of points acquired by the LIDAR sensor contained within the section, the other theoretical coordinates being able to be defined as the coordinates of a point on an ideal circle inscribed within the plane of the road centered on the vehicle.

It is possible to determine at least two sectors in the plane of the vehicle, each associated with a direction of scanning the sector, for each sector, the following steps can be carried out:

the LIDAR data are scanned in the scanning direction, a determination is made as to whether each LIDAR datum belongs to the road, the scanning of the LIDAR data is interrupted as soon as it is determined that a LIDAR datum does not belong to the road and it is determined that the LIDAR data of the sector that have not been scanned do not belong to the road.

For each sector, a Gaussian filter can be applied to the results of the determination of the standard deviation in order to reduce the impact of the irregularities, notably a Gaussian filter with size 3 kernel and of standard deviation 5.

The direction of movement of the vehicle running forward can be defined as corresponding to an angle 0 of the angle of the beam in the plane of the vehicle, four sectors can be defined in the plane of the vehicle,

- a first sector comprising the LIDAR data for which the angle in the plane of the vehicle extends from the angle 0 to the angle $\pi/2$, and in which the LIDAR data are scanned from the initial angle 0 to the final angle $\pi/2$ in the plane of the vehicle,
- a second sector comprising the LIDAR data for which the angle in the plane of the vehicle extending from the angle $\pi/2$ to the angle $\pi$, and in which the LIDAR data are scanned from the initial angle $\pi$ to the final angle $\pi/2$ in the plane of the vehicle,
- a third sector comprising the LIDAR data for which the angle in the plane of the vehicle extends from the angle $\pi$ to the angle $3\pi/2$ and in which the LIDAR data are scanned from the initial angle $\pi$ to the final angle $3\pi/2$ in the plane of the vehicle, and
- a fourth sector comprising the LIDAR data for which the angle in the plane of the vehicle extends from the angle $3\pi/2$ to the angle 0, and in which the LIDAR data are scanned from the initial angle 0 to the final angle $3\pi/2$ in the plane of the vehicle.

The steps relating to each sector can be performed via a distinct processing means.

For each angle of the beam with respect to the plane of the vehicle, it can be determined that a LIDAR datum belonging to the road corresponds to a marking on the ground, if the reflected light intensity perceived by the LIDAR sensor is lower than a predetermined threshold.

A tracking method can be used to ensure the tracking of the road when it is subject to at least partial occlusion.

The motor vehicle can be an autonomous vehicle.

Figure 2:
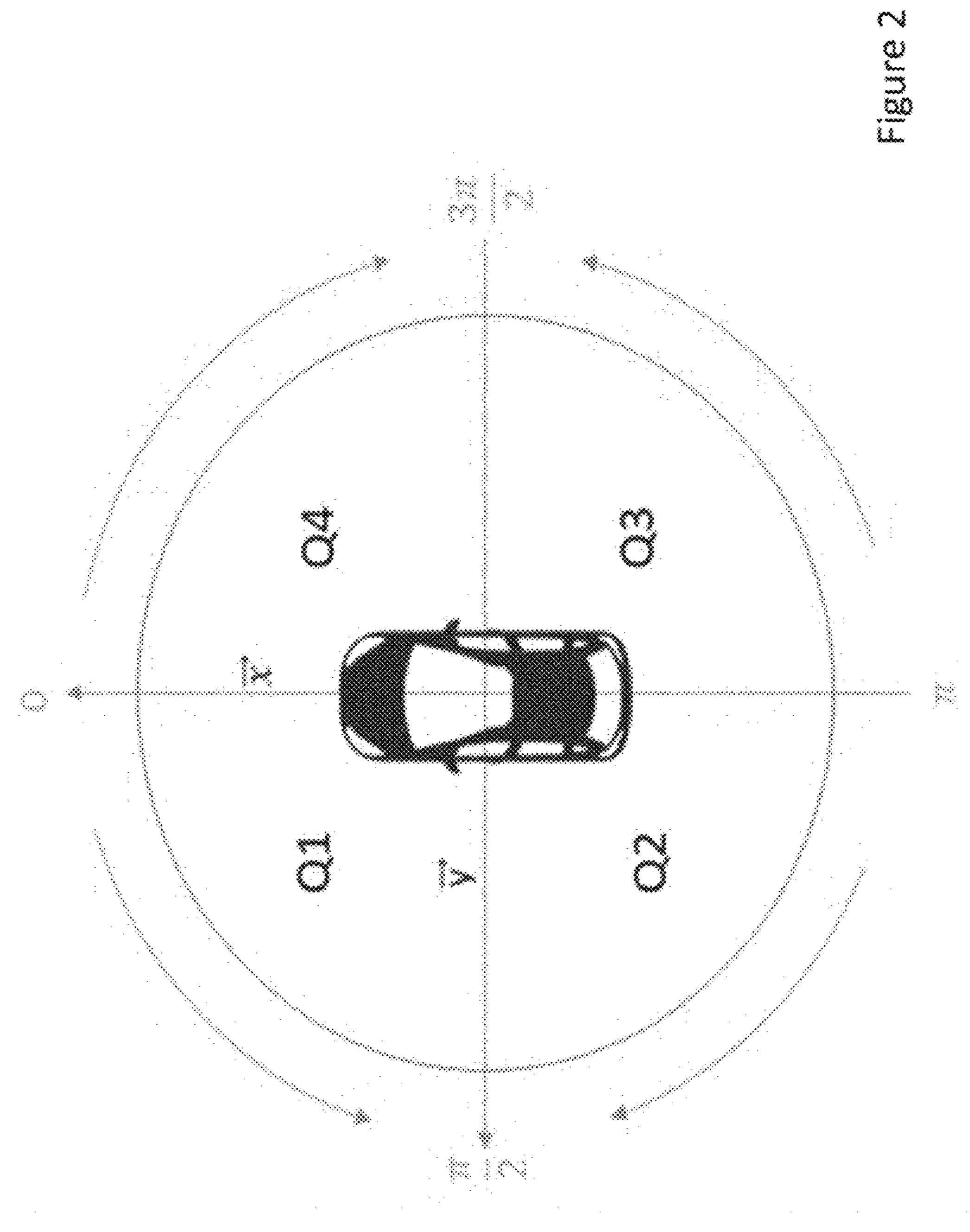

Other aims, features and advantages of the invention will become apparent on reading the following description, given purely as a nonlimiting example and with reference to the attached drawings in which:

FIG. 1 illustrates a polar view of the LIDAR data obtained for an angle of the laser beam with respect to the plane of the vehicle, and FIG. 2 illustrates an example of sectors scanned by the method.

The road detection method makes it possible to determine the position of the road with respect to the vehicle through the use of a rotary multilayer LIDAR sensor.

It will be recalled that a LIDAR is a sensor which makes it possible to determine the distance between the sensor and obstacles by emitting laser beams at regular intervals, beams which are reflected by the objects of the environment. The beams that are thus reflected are detected by the LIDAR to estimate the position of the object that has reflected the beam.

A LIDAR sensor can also be driven by a rotational movement, notably 360° to detect the position of the points of its environment.

Such a LIDAR sensor, reference 1 in FIG. 1, comprises several lasers each oriented with a different angle with respect to the plane of the vehicle. By turning, and by performing multiple acquisitions during one rotation, the LIDAR sensor determines the position of the points of reflection of each laser beam on a surface and generates a cloud of points whose coordinates correspond to the relative positions of the points of reflection with respect to the LIDAR sensor.

The coordinates of a point of reflection P are generally expressed as polar coordinates in the form $(r,\theta,\varphi)$ with r denoting the distance between the sensor and the point of reflection, $\theta$ denoting the angle of the beam with respect to the plane of the vehicle and $\varphi$ denoting the angle of the beam in the plane of the vehicle. FIG. 1 illustrates such a reference frame. The plane of the vehicle is understood to be the plane of the chassis of the vehicle or a plane parallel to the chassis of the vehicle. It should also be noted that the reference frame linked to the vehicle is linked to the reference frame of the LIDAR such that no transformation by rotation is necessary to switch from one reference frame to the other.

Since the LIDAR sensor generates a very large cloud of points on each complete rotation, it is necessary to carry out segmentation thereof in order to limit the computation times. For the rest of the description, a point of the cloud of points is considered to be a LIDAR datum.

During a first step of the segmentation, the only data considered are the LIDAR data for which the angle $\theta$ is negative, that is to say, the LIDAR data deriving from laser beams emitted with an angle below the plane passing through the sensor parallel with the plane of the vehicle. In fact, only these beams can interact with the road.

During a second step of the segmentation, the LIDAR data are separated as a function of their angle $\theta$ with respect to the plane of the vehicle. In fact, the inventors have recognized that the laser beams emitted for a given angle $\theta$ with respect to the plane of the vehicle form an ideal circle on a road considered to be smooth, continuous and virtually flat.

By contrast, when a laser beam passes over something other than the road, such as the roadside, a dispersion of position around the ideal circle is obtained.

To identify the points of the road, the following substeps are performed for each set of LIDAR data associated with an angle $\theta$ with respect to the plane of the vehicle.

The theoretical coordinates $(x_{th},y_{th},z_{th})$ of the points of the ideal circle are determined as a function notably of the angle $\theta$ with respect to the plane of the vehicle.

For a given angle $\theta$ with respect to the plane of the vehicle and for each angle $\varphi$ in the plane of the vehicle, the standard deviation $\sigma$ between the theoretical coordinates $(x_{th},y_{th},z_{th})$ and the coordinates $(x_i,y_i,z_i)$ of the LIDAR datum for one and the same angle $\varphi$ is determined by application of the following equation Eq. 1.

$$\sum_{n}^{i=0} \sqrt{(x_{th}-x_i)^2+(y_{th}-y_i)^2+(z_{\mu}-z_i)^2} = \sigma \qquad \text{(Eq. 1)}$$

Despite the segmentation put in place above, the quantity of data to be processed remains significant. Note that, for a given angle $\theta$ with respect to the plane of the vehicle, the LIDAR sensor scans 360° or $2\pi$ relative to the angle $\varphi$ in the plane of the vehicle.

To improve the segmentation of the cloud of points obtained from the LIDAR sensor, it is proposed to reduce the number of points relating to the angle $\varphi$ in the plane of the vehicle.

To achieve that, it is considered that the resolution of the LIDAR sensor can be degraded without significant impact on the road detection capacity.

Then, within a section $S_i$, several points having one and the same angle $\theta$ with respect to the plane of the vehicle and for which the angles $\varphi$ in the plane of the vehicle are successive and extend over a predefined angular interval $\Delta\varphi$, are grouped together. The predefined angular interval can take a value lying between 1° and 5°. FIG. 1 illustrates such a section $S_i$. The grouping together of the points can be performed by the determination of an average value of the coordinates of the points of the section. The sections $S_i$ thus form an alternative LIDAR datum to the points of the cloud of points obtained from the LIDAR sensor.

Such a grouping together of points within sections $S_i$ (i varying from 1 to n, n being the total number of sections) is performed for all the points having one and the same angle θ with respect to the plane of the vehicle, and this is done before the determination of the standard deviation σ.

In an alternative embodiment, when sections $S_i$ are considered as LIDAR data, for each section $S_i$, the theoretical height $z_{th}$ of a point of the ideal circle is replaced by the average $z_\mu$ of the height $z_i$ of the points of the cloud of points contained in the section $S_i$. A modified version of the equation Eq. 1 is then used to determine the standard deviation σ.

$$\sum_{n}^{i=0} \sqrt{(x_{th}-x_i)^2+(y_{th}-y_i)^2+(z_\mu-z_i)^2} = \sigma \quad \text{(Eq. 2)}$$

The equations Eq. 1 and Eq. 2 are expressed in Cartesian coordinates. However, the transformation of these equations into equations expressed in a polar reference frame forms part of the general knowledge of a person skilled in the art. It is thus possible to retain a polar reference frame for all the steps of the method.

Independently of the LIDAR data considered, points of the cloud of points or sections $S_i$, it is determined that the LIDAR data for which the standard deviation σ is below a predefined threshold form part of the road, the other sections not forming part of the road.

To further reduce the quantity of data to be processed, it is proposed not to scan all of the LIDAR data having one and the same angle θ in determining the standard deviation σ.

For that, the space in the plane of the vehicle and corresponding to the angle φ is subdivided into sectors. In one embodiment, illustrated by FIG. 2, it is possible to define a first sector Q1 front left of the vehicle, a second sector Q2 rear left of the vehicle and a third sector Q3 rear right of the vehicle and a fourth sector Q4 front right of the vehicle. It is also possible to define the sectors with respect to their limit angles φ. Thus, the first sector Q1 extends from the angle φ=0 to the angle φ=π/2, the second sector Q2 from the angle φ=π/2 to φ=π, the third sector Q3 from the angle φ=π to φ=3π/2 and the fourth sector Q4 from φ=3π/2 to φ=0, with φ=0 aligned with the direction of movement of the vehicle running forward.

When seeking to determine which LIDAR data having one and the same angle θ belong to the road, the LIDAR data are scanned for an angle φ varying from 0 to π/2 for the first sector Q1, from π to π/2 for the second sector Q2, from π to 3π/2 for the third sector Q3, and from 0 to 3π/2 for the fourth sector. Such a scanning order makes it possible to give priority to detection of the road in front of and behind the vehicle, which are the prioritized directions of movement of the vehicle.

When scanning a sector, the LIDAR data which do not correspond to the road, that is to say, the LIDAR data for which the standard deviation a is above the predetermined threshold, are sought. The search is performed for each sector between the angles and in the direction identified above and up to the angle for which the standard deviation becomes greater than or equal to the predetermined threshold. Then, the scanning of the LIDAR data of the sector is stopped. The remaining LIDAR data that have not been scanned are considered not to form part of the road.

After having performed the search over the four sectors, the LIDAR data that do not correspond to the road are eliminated so as to retain only the LIDAR data of the road.

The processing of the sectors can be performed sequentially or simultaneously depending on the number and the power of the computation units.

In a particular embodiment, a Gaussian filter with standard deviation σ is applied to each sector Q1, Q2, Q3, Q4 in order to reduce the impact of the irregularities before the search for the points or sections belonging to the road. A filter with size 3 kernel and of standard deviation 5 is particularly suited to this use.

In a particular embodiment, the lane markings are sought as a function of the intensity of the laser beam reflected for each point. In fact, a LIDAR sensor makes it possible to detect different materials based on the intensity of the light returned. It is thus possible to identify the lane boundaries on the road using the reflectivity of the markings on the ground.

For that, the intensity associated with each point corresponding to the road is compared to a predetermined threshold. The markings on the ground are the points for which the intensity is lower than the predetermined threshold which belong to the road.

In a particular embodiment, a tracking method is used to ensure the tracking of the road limits when they are subject to occlusion (by vehicles, for example).

The invention claimed is:

1. A road detection method for a motor vehicle provided with a rotary multilayer LIDAR sensor and data processing circuitry, the method comprising:

acquiring LIDAR data of an environment of the motor vehicle as polar coordinates with the LIDAR sensor;

eliminating the data for which the polar coordinate relating to an angle of a beam with respect to a plane of the vehicle is greater than or equal to zero from the acquired LIDAR data; and for each angle of the beam with respect to the plane of the vehicle, and for each LIDAR datum, the following are carried out:

determining theoretical coordinates of a point, corresponding to the LIDAR datum, as a function of the angle of the beam with respect to the plane of the vehicle and of the angle of the beam in the plane of the vehicle, determining a standard deviation between the theoretical coordinates and the coordinates of the LIDAR datum, and determining that the LIDAR datum forms part of the road when the standard deviation is lower than a predefined threshold, wherein a LIDAR datum is a point of a cloud of points acquired by the LIDAR sensor over one revolution, or a section comprising at least two consecutive points of the cloud of points acquired by the LIDAR sensor that have the same beam angle with respect to the plane of the vehicle, and when the LIDAR datum is a point of the cloud of points, the theoretical coordinates of the point corresponding to the LIDAR datum are determined as those of a point contained within an ideal circle inscribed within the plane of the road centered on the vehicle, the ideal circle surrounding the vehicle, at least two sectors are determined in the plane of the vehicle for each angle of the beam with respect to the plane of the vehicle, each sector being associated with a direction of scanning the sector, for each sector, the LIDAR data are scanned in the scanning direction, a determination is made as to whether each LIDAR datum belongs to the road, the scanning of the LIDAR data is interrupted when the method determines that a LIDAR datum does not belong to the road and when the method determines that the LIDAR data of the sector that have not been scanned do not belong to the road, a sector of the at least two sectors comprises a LIDAR datum having a same angle of the beam with respect to the plane of the vehicle as a LIDAR datum of another sector of the at least two sectors, and each LIDAR datum within each sector of the at least two sectors has the same angle of the beam with respect to the plane of the vehicle as all other LIDAR datum within the same sector.

2. The method as claimed in claim 1, wherein, when the LIDAR datum is a section comprising at least two points of the cloud of points, the theoretical coordinates and the coordinates of the sections being defined as Cartesian coordinates and comprising a coordinate in a direction of movement of the vehicle in the plane of the vehicle, a coordinate in a direction at right angles to the direction of movement of the vehicle in the plane of the vehicle and a theoretical coordinate on the normal to the plane of the vehicle, the theoretical coordinate on the normal to the plane of the vehicle is defined as an average of the coordinates on the normal to the plane of the vehicle of the points of the cloud of points acquired by the LIDAR sensor contained within the section, and the other theoretical coordinates are defined as the coordinates of a point on an ideal circle inscribed within the plane of the road centered on the vehicle.

3. The method as claimed in claim 1, wherein, for each sector, a Gaussian filter is applied to results of the determination of the standard deviation in order to reduce impact of irregularities.

4. The method as claimed in claim 3, wherein the Gaussian filter has a size 3 kernel and a standard deviation of 5.

5. The method as claimed in claim 1, wherein a direction of movement of the vehicle running forward is defined as corresponding to an angle 0 of the angle of the beam in the plane of the vehicle, and four sectors are defined in the plane of the vehicle, a first sector comprising the LIDAR data for which an angle in the plane of the vehicle extends from the angle 0 to an angle $\pi/2$, and in which the LIDAR data are scanned from the angle 0 to the angle $\pi/2$ in the plane of the vehicle, a second sector comprising the LIDAR data for which the angle in the plane of the vehicle extending from the angle $\pi/2$ to an angle $\pi$, and in which the LIDAR data are scanned from the angle $\pi$ to the angle $\pi/2$ in the plane of the vehicle, a third sector comprising the LIDAR data for which the angle in the plane of the vehicle extends from the angle $\pi$ to an angle $3\pi/2$ and in which the LIDAR data are scanned from the angle $\pi$ to the angle $3\pi/2$ in the plane of the vehicle, and a fourth sector comprising the LIDAR data for which the angle in the plane of the vehicle extends from the angle $3\pi/2$ to the angle 0, and in which the LIDAR data are scanned in the plane of the vehicle from the angle 0 to the angle $3\pi/2$ in the plane of the vehicle.

6. The method as claimed claim 1, wherein the steps relating to each sector are performed via distinct processing circuitry.

7. The method as claimed in claim 1, wherein, for each angle of the beam with respect to the plane of the vehicle, the method determines that a LIDAR datum belonging to the road corresponds to a marking on a ground, when a reflected light intensity perceived by the LIDAR sensor is lower than a predetermined threshold.

8. The method as claimed in claim 1, wherein the motor vehicle is an autonomous vehicle.

9. The method as claimed in claim 1, further comprising:

determining four sectors in the plane of the vehicle, each sector being associated with a direction of scanning the sector, wherein a direction of movement of the vehicle running forward is defined as corresponding to an angle 0 of the angle of the beam in the plane of the vehicle, the four sectors include:

a first sector comprising the LIDAR data for which an angle in the plane of the vehicle extends from the angle 0 to an angle $\pi/2$, and in which the LIDAR data are scanned from the angle 0 to the angle $\pi/2$ in the plane of the vehicle, a second sector comprising the LIDAR data for which the angle in the plane of the vehicle extending from the angle $\pi/2$ to an angle $\pi$, and in which the LIDAR data are scanned from the angle $\pi$ to the angle $\pi/2$ in the plane of the vehicle, a third sector comprising the LIDAR data for which the angle in the plane of the vehicle extends from the angle $\pi$ to an angle $3\pi/2$ and in which the LIDAR data are scanned from the angle $\pi$ to the angle $3\pi/2$ in the plane of the vehicle, and a fourth sector comprising the LIDAR data for which the angle in the plane of the vehicle extends from the angle $3\pi/2$ to the angle 0, and in which the LIDAR data are scanned in the plane of the vehicle from the angle 0 to the angle $3\pi/2$ in the plane of the vehicle, and the first sector, the second sector, the third sector, and the fourth sector surround the vehicle.

10. The method as claimed in claim 9, further comprising:

scanning, for each of the first sector, the second sector, the third sector, and the fourth sector, the LIDAR data in the scanning direction;

determining whether each LIDAR datum belongs to the road; and interrupting the scanning of the LIDAR data in response to determining that a LIDAR datum does not belong to the road, the method determining that the LIDAR data of the sector that have not been scanned do not belong to the road.

* * * * *